(12) United States Patent
Zheng et al.

(10) Patent No.: US 6,356,231 B1
(45) Date of Patent: Mar. 12, 2002

(54) MONOPULSE RADAR PROCESSOR FOR RESOLVING TWO SOURCES

(75) Inventors: Yibin Zheng, Rexford; Kai-Bor Yu, Niskayuna, both of NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/607,146

(22) Filed: Jun. 29, 2000

(51) Int. Cl.$^7$ .............................................. G01S 13/44
(52) U.S. Cl. ...................... 342/149; 342/195
(58) Field of Search .................. 342/80, 149, 150, 342/151, 152, 147, 195

(56) References Cited

U.S. PATENT DOCUMENTS

| | | |
|---|---|---|
| 5,049,888 A | 9/1991 | Prenat |
| 5,200,753 A | 4/1993 | Janusas |
| 5,241,318 A | 8/1993 | Howard |
| 5,815,112 A | 9/1998 | Sasaki et al. |
| 5,831,570 A | 11/1998 | Ammar et al. |
| 6,087,974 A | * 7/2000 | Yu ............................. 342/149 |

* cited by examiner

*Primary Examiner*—Ian J. Lobo
(74) *Attorney, Agent, or Firm*—Scully, Scott, Murphy & Presser

(57) ABSTRACT

A method and system for identifying the locations of plural targets lying within the main beam of a monopulse antenna including four ports for generating sum, elevation difference, azimuth difference, and double difference signals. The method comprises the steps of processing the sum, elevation difference, azimuth difference, and double difference signals in accordance with a series of linear equations to obtain a set of intermediate values; and processing the set of intermediate values in accordance with a set of algebraic equations to obtain signals representing an angular direction of each of the plural targets. Preferably, the method further includes the step of processing the sum, elevation difference, azimuth difference and double difference signals and the signals representing the angular directions of the targets according to a further set of algebraic equations to obtain signals representing the amplitude of the beam reflected from each of the targets. Also, in a preferred embodiment, the signals representing the angular direction of the targets include signals representing, for each of the targets, an angular direction of the target in an x-plane, and an angular direction of the target in a y-plane.

12 Claims, 5 Drawing Sheets

Monopulse Angle Estimator Processing

Monopulse Angle Estimator Processing

Demonstration of Monopulse 2 Source Resolution.
The Circles are Locations of True Sources, while the Dots are Scatter Plots of Estimates from 100 Monte-Carlo Runs.

MONOPULSE RADAR PROCESSOR FOR RESOLVING TWO SOURCES

FIELD OF THE INVENTION

This invention relates to arrangements, systems or receivers using monopulse techniques, such as those receivers used for radar surveillance or for radio frequency (RF) missile seekers, and more particularly to improved arrangements for locating targets, including up to two targets within the main beam of the antenna.

BACKGROUND OF THE INVENTION

The problem of resolving more than one scattering center in a radar beam draws interest from many radar applications such as tracking, target recognition, and surveillance. When two scattering centers fall within the same range-doppler cell, their complex amplitude interfere with each other, causing a phenomena called "glint," where the indicated angle of the target wanders wildly. One technique to alleviate this problem is to resolve the scattering centers in range using a wide bandwidth waveform (HRR). However wideband processing is expensive and there are technological limits to this technique. Furthermore, in an electronic counter measure (ECM) scenario where there is a jammer whose radiation is present in each range cell, range resolving techniques would not help. Therefore it is desirable to develop techniques to resolve two sources, reflective or radiating, in angular dimensions.

There have been extensive studies in this direction. Monopulse processing techniques for multiple targets are discussed in "Multiple Target Monopulse Processing Techniques," by Peebles and Berkowitz, IEEE Transactions on Aerospace and Electronic Systems, Vol. AES-4, No. 6, November 1968. However, the technique disclosed therein requires special antenna configurations that are much more complicated than the sum-difference channels normally used in monopulse radars. Moreover, the proposed technique generally requires six beams to resolve two targets. The article "Complex Indicated Angles Applied to Unresolved Radar Targets and Multipath," by Sherman, IEEE Transactions on Aerospace and Electronic Systems, Vol. AES-7, No. 1, January 1971, concludes that with a conventional monopulse configuration, a single pulse solution is impossible. This reference discloses a method to resolve two targets using two independent measurements, but it is not a "monopulse" technique per se.

Techniques have been developed based on the PRIME-MUSIC and ESPRIT algorithms, but again these techniques require multiple measurements. Such techniques are disclosed in "A Class of Polynomial Rooting Algorithms for Joint Azimuth/Elevation Estimation Using Multidimensional Arrays," by G. F. Hatke and K. W. Forsythe, $28^{th}$ Asilomer Conference on Signals, Systems and Computers, Pacific Grove, Calif., 1994; and "ESPRIRT—Estimation of Signal Parameters Via Rotational Invariant Techniques," by R. Roy and T. Kailath, IEEE Transactions on Acoustics, Speech, Signal Processing, Vol. 37, pp. 984–995, July 1989. Techniques using multiple pulses may suffer from the target fluctuations between pulses. Also, there may not be time for multiple measurements, especially when pulse compression is used to generate fine range—doppler profile.

SUMMARY OF THE INVENTION

An object of this invention is to provide a method and apparatus for resolving two sources in the same range-doppler cell in a monopulse radar beam.

Another object of the present invention is to use the conventional monopulse radar antenna configuration and literally a single pulse radar measurement to achieve two target resolution.

These and other objective are attained with a method and system for identifying the locations of plural targets lying within the main beam of a monopulse antenna including four ports for generating sum, elevation difference, azimuth difference, and double difference signals. The method comprises the steps of processing the sum, elevation difference, azimuth difference, and double difference signals in accordance with a series of linear equations to obtain a set of intermediate values; and processing those intermediate values in accordance with a set of algebraic equations to obtain signals representing an angular direction of each of the plural targets.

Preferably, the method further includes the step of processing the sum, elevation difference, azimuth difference and double difference signals and the signals representing the angular directions of the targets according to a further set of algebraic equations to obtain signals representing the amplitude of the beam reflected from each of the targets. Also, in a preferred embodiment, the signals representing the angular direction of the targets include signals representing, for each of the targets, an angular direction of the target in an x-plane, and an angular direction of the target in a y-plane.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
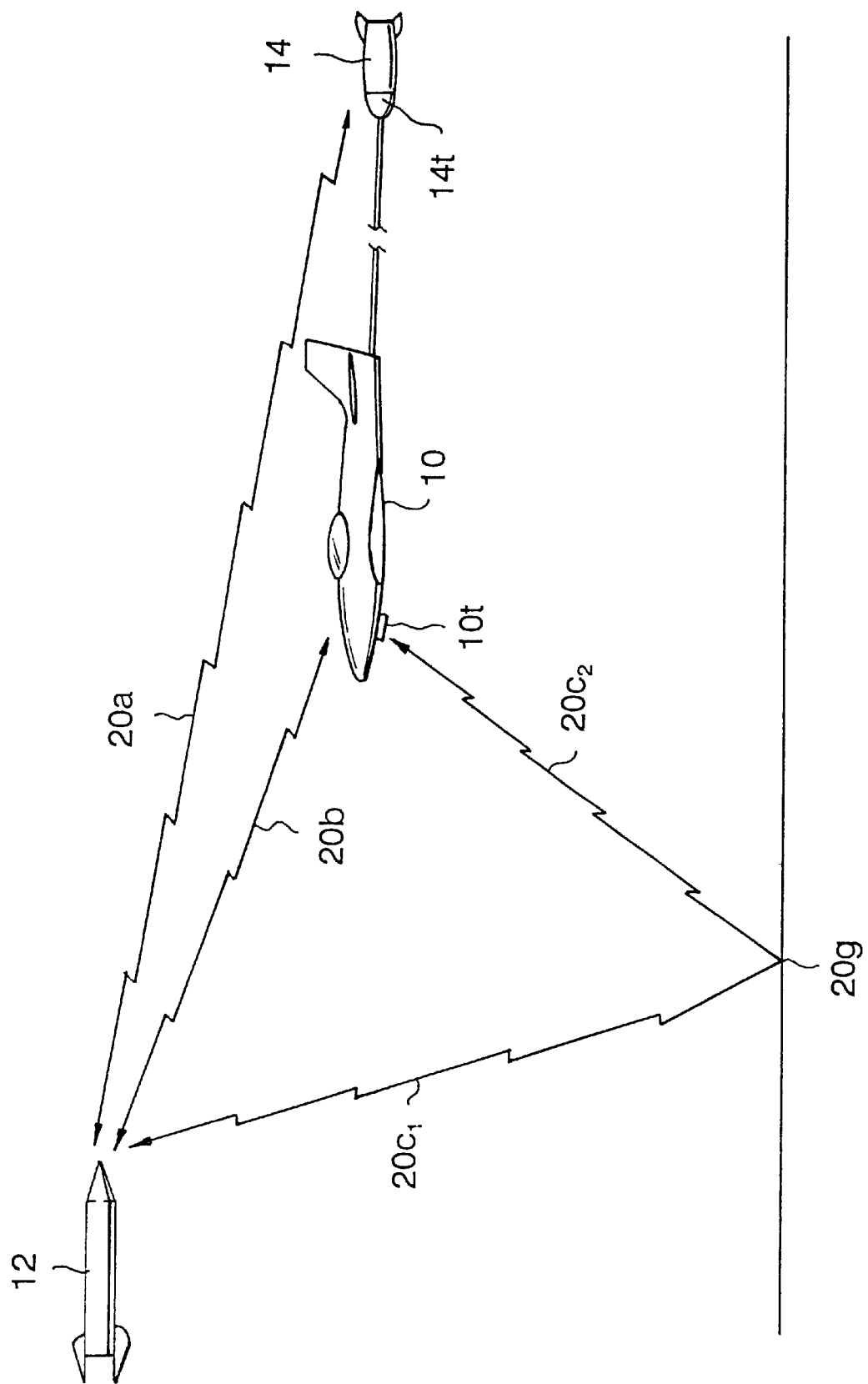
FIG. 1 is a simplified representation of a missile attacking a target aircraft which is using a repeater and towing a decoy.

In FIG. 1, an aircraft 10 is represented as being attacked by a missile 12. Missile 12 determines the location of the target aircraft 10 by use of radar using monopulse techniques. The target aircraft 10 defends itself by two different methods, namely by use of a decoy 14, and by use of a ground-pointing transponder 10t. Various radar signals are generated and irradiated out via the missile 12, which are represented by "lightning bolt" symbols forming antenna beams 20a, 20b and $20c_1$. Antenna beams 20a, 20b and $20c_1$ may be generated either simultaneously or sequentially. Antenna beam 20a is directed toward the decoy 14, beam 20b is directed toward the aircraft, and beam $20c_1$ is directed toward the ground at a location 20g.

Since the decoy 14 is smaller than the aircraft, its radar signature or reflection as perceived by the missile on beam 20a would ordinarily be smaller than that of the aircraft as perceived on beam 20b. In an attempt to make the decoy appear, to the missile 12, to be larger than the aircraft, the decoy includes a transponder 14t, which receives the transmitted radar signals arriving over antenna beam 20a or 20b communicated through a cable between aircraft 10 and decoy 14, and amplifies and retransmits the signals. The amplified and retransmitted signals retrace their paths over beam 20a, and arrive back at the missile with greater amplitude than the signals transmitted over antenna beam 20b and reflected by aircraft 10.

The aircraft 10 of FIG. 1 may operate its ground-directed transponder 10t in such a manner as to retransmit those signals transmitted by missile 12 over antenna beam $20c_1$, reflected from that portion of the earth's surface lying near location 20g, and arriving at the aircraft 10 by way of path $20c_2$. At least some of the energy retransmitted by transponder lot flows along path $20c_2$, is reflected from location 20g, and flows back along path $20c_1$ to the missile. The transponder 10t may be used instead of the decoy 14, or in conjunction with the decoy 14, or the decoy 14 may be used alone. Regardless of which defense technique is used by aircraft 10, the missile receives strong signals from directions that are not the direction of the target aircraft, and consequently the missile may not be able to identify correctly the direction of the aircraft relative to the missile.

The problem of identification of the proper target is exacerbated when the main beam or main lobe of the antenna is relatively wide, because the main beam of the radar of missile 12 may subtend both the aircraft 10 and the decoy 14, or both the aircraft 10 and the ground reflection region 20g. This state of affairs is equivalent to beams 20a and 20b of FIG. 1, or beams 20b and 20c, being parts of one beam.

When the main beam subtends two targets, the conventional monopulse system is incapable of separating the signals, and so a combined signal is used to access the look-up table that quantifies the shape of the main beam, with the result that the two targets may be misidentified as one, and the location of the "single"0 target will be in error.

In accordance with the present invention a method and system are provided in which a monopulse radar system is able t identify separately the aircraft 10 and the decoy 14, and to identify correctly the separate positions of these two objects.

Figure 2A:
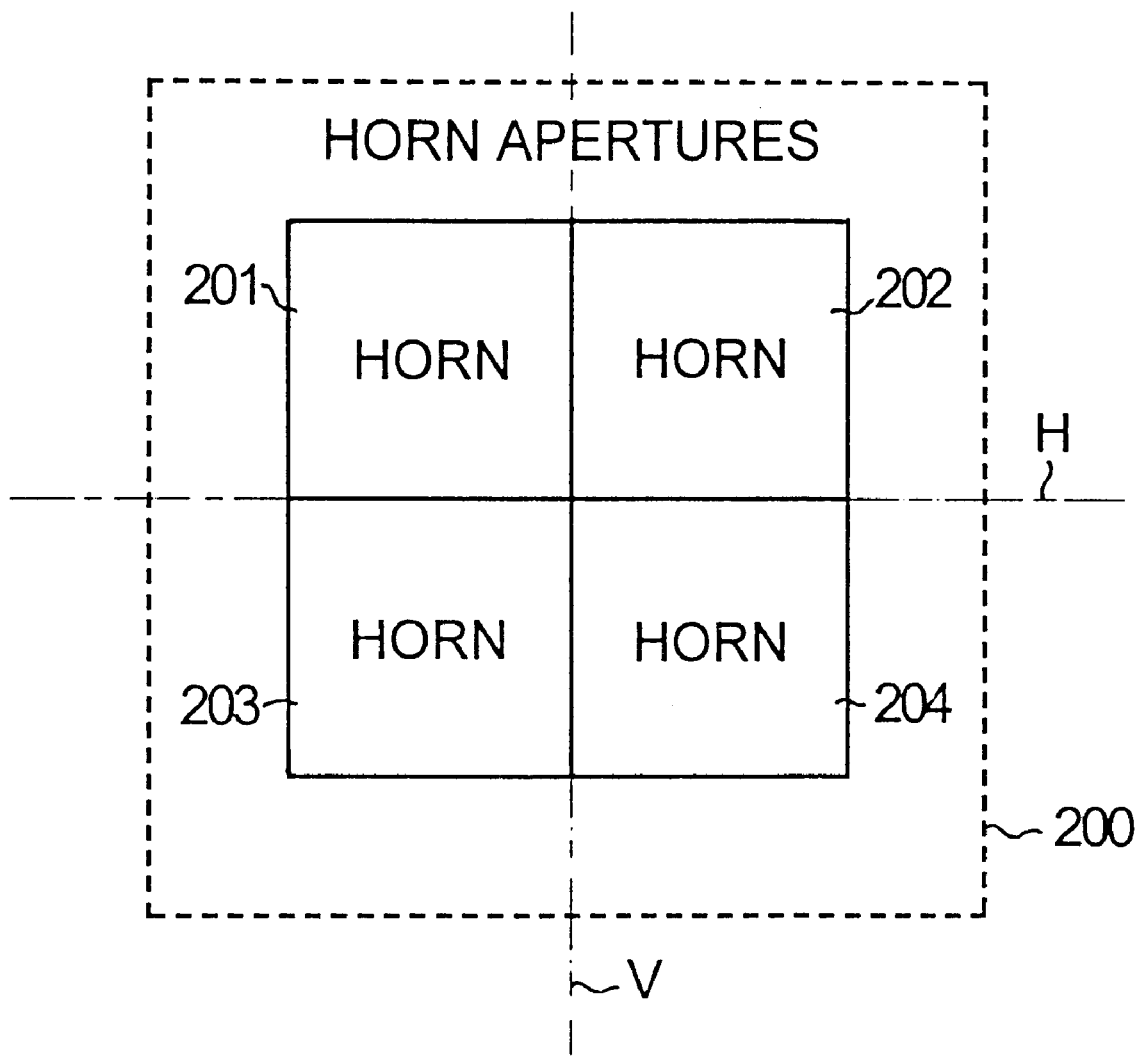
FIG. 2a is a simplified representation of the physical arrangement of an antenna including multiple horn antennas.
Figure 2B:
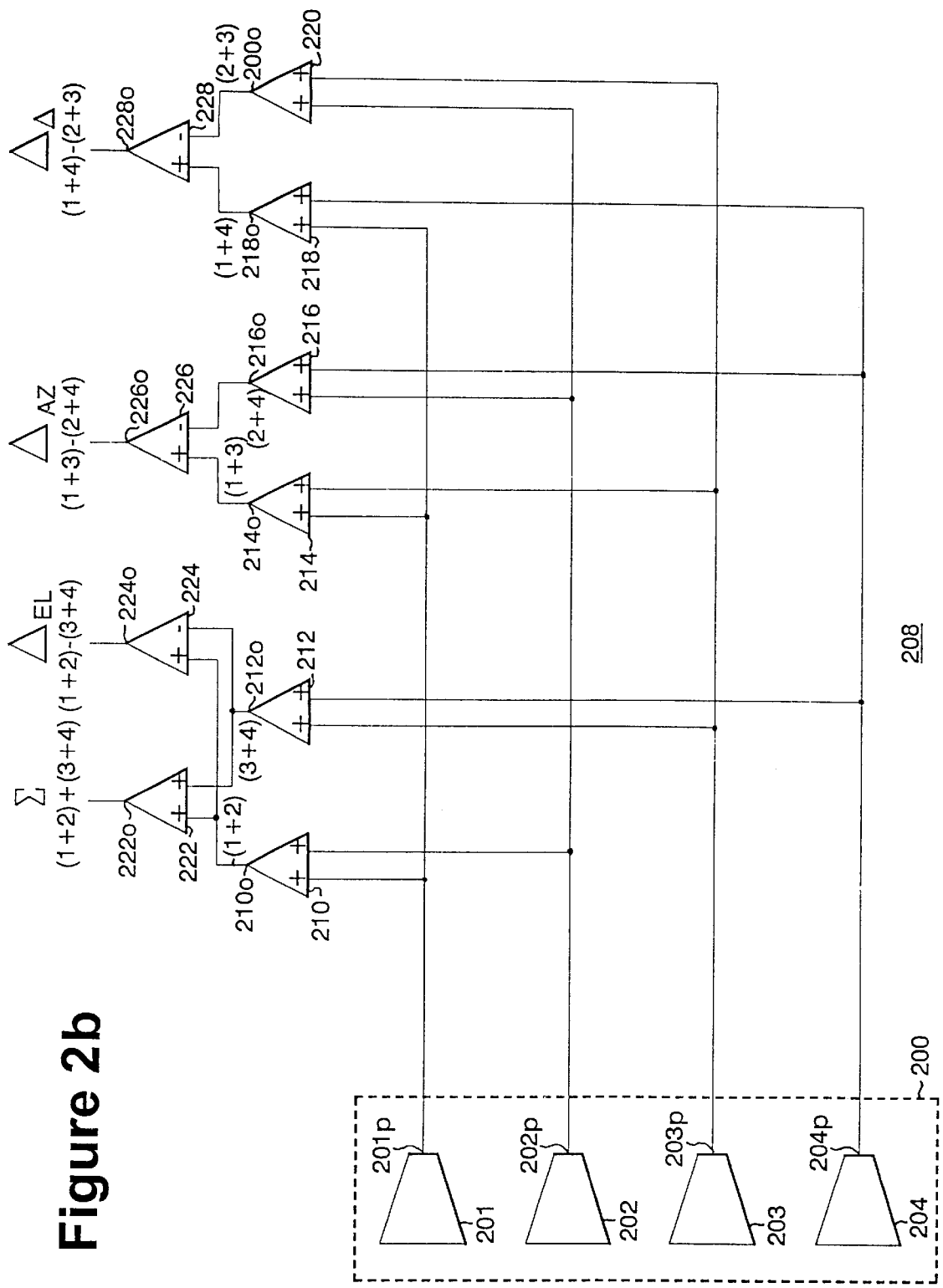
FIG. 2b is a simplified block diagram showing the connections of the horns of FIG. 2a to generate monopulse signals.

FIG. 2a is a simplified physical representation of a four horn monopulse antenna 200. In FIG. 2a, each of four horn apertures, commonly referred to simply as horns, are designated as 201, 202, 203 and 204. Horn 201 lies over horn 203, and horn 202 lies over horn 204, and horns 201 and 202 lie above a horizontal plane of separation H. Similarly, horns 201 and 203 lie to the left, and horns 202 and 204 lie to the right, of a vertically oriented plane of separation V. FIG. 2b is a simplified illustration of the connections of horns 201, 202, 203 and 204 of antenna 200 of FIG. 2a for generation of sum and difference beams.

More particularly, as shown in FIG. 2b, an output port 201P of horn 201 is connected to noninverting (+) input ports of summing circuits or adders 210, 214 and 218; and an output port 202P of horn 202 is connected to noninverting input ports of summing circuits 210, 216 and 220. An output port 203P of horn 203 is connected to noninverting input ports of summing circuits 212, 214 and 220; and an output port 204P of horn 204 is connected to noninverting input ports of summing circuits 212, 216 and 218. As a result of these connections, the signal at the output port 210o of summing circuit 210 represents the sum of the signals of horns 201 and 202, or in the notation of FIG. 2b, "(1+2)". Similarly, the output signal at output port 212o of summing circuit 212 represents the sum of the signals of horns 203 and 204, or (3+4), and the output signal at output port 214o of summing circuit 214 represents (1+3). The output signal at output port 216o of summing circuit 216 represents (2+4), the output signal at output port 218o of summing circuit 218 represents (1+4), and the output signal at output port 220 of summing circuit 220 represents (2+3).

In FIG. 2b, a summing circuit 222 has its noninverting input ports coupled to output ports 210o and 212o of summing circuits 210 and 212, respectively, for producing, at its output port 222o, the sum (Σ) signal representing (1+2)+(3+4). A summing circuit 224 has a noninverting input port coupled to output port 210o of summing circuit 210, and an inverting input port coupled to output port 212o of summing circuit 212, for producing, at its output port 224o, the elevation difference ($\Delta_{EL}$) signal representing (1+2)−(3+4). A summing circuit 226 has a noninverting input port coupled to output port 214o of summing circuit 214, and also has an inverting input port coupled to output port 216o of summing circuit 216, for producing, at its output port 226o, the azimuth difference ($\Delta_{AZ}$) signal representing (1+4)−(2+3). A summing circuit 228 has a noninverting input port coupled to output port 218o of summing circuit 218, and also has an inverting input port coupled to output port 220o of summing circuit 220, for producing, at its output port 228o, the double difference ($\Delta_A$) signal representing (1+3)−(2+4).

It should be understood that the arrangement of FIGS. 2a and 2b represents only one kind of monopulse signal generating antenna. Other types are well known, including the array type, in which the beamformer generates the desired beams directly, and these other types of monopulse antennas may be used in a system according to the invention, so long as they are arranged to produce at least the sum signals, and azimuth, elevation, and double difference signals.

Ideally, for a single target with direction cosines $T_x$ and $T_y$, the delta channels are related to the sum channel by $$\Delta_{az} = jT_x\Sigma$$
$$\Delta_{el} = jT_y\Sigma \quad (1)$$
$$\Delta_e = -T_xT_y\Sigma$$

Here, the monopulse slopes are absorbed into $T_x$ and $T_y$ for convenience. For a single target, only 3 channels are needed, the Σ and the $\Delta_{az}$ and $\Delta_{el}$, to determine the target's direction. Therefore in most radars, the $\Delta_A$ output is treated as a by-product and terminated without use.

The present invention in contrast, uses this $\Delta_A$ output. In particular, the invention utilizes this output in a manner that enables the radar system to resolve between two scattering centers in the same beam. The two key features of this invention are: (1) to make use of the $\Delta_A$ signal, and (2) to take advantage of the fact that the direction cosines are real. For the moment neglecting noise, the baseband measurement can be formulated as $$\Sigma = \Sigma_1 + \Sigma_2$$
$$\Delta_{az} = j\Sigma_1 T_{x,1} + j\Sigma_2 T_{x,2}$$
$$\Delta_{el} = \Sigma_{y,1} + j\Sigma_2 T_{y,2}$$
$$\Delta_A = -\Sigma_1 T_{x,1} T_{y,1} - \Sigma_2 T_{x,2} T_{y,2} \quad (2)$$

where the subscripts 1, 2 denote the 2 sources in the radar beam. Define the following quantities:

$$A=Im(\Delta_{az}\Delta^*_{el})$$

$$B=Re(\Sigma\Delta^*_{el})$$

$$C=Re(\Sigma\Delta^*_{az})$$

$$D=Im(\Sigma\Delta^*_\Delta)$$

$$E=Re(\Sigma_{az}\Delta^*_\Delta)$$

$$F=Re(\Delta_{el}\Delta^*_\Delta) \quad (3)$$

It can be shown that the following equations are satisfied:

$$BT_{x,n}-CT_{y,n}=A$$

$$BT_{x,n}^2+(D-A)T_{x,n}+E=0 \quad (4),$$

$$CT_{y,n}^2+(D+A)T_{y,n}+F=0$$

where n=1, 2

From these equations, a solution for $T_x$ and $T_y$ can be found:

$$T_{x,n} = \frac{(A-D) \pm \sqrt{(A-D)^2 - 4EB}}{2B} \quad (5)$$

$$T_{y,n} = \frac{BT_{x,n} - A}{C}, \quad \text{where } n = 1, 2$$

Once the $T_x$ and $T_y$ are known the amplitudes of each source can be solved through the linear system of equations (2).

Figure 3:
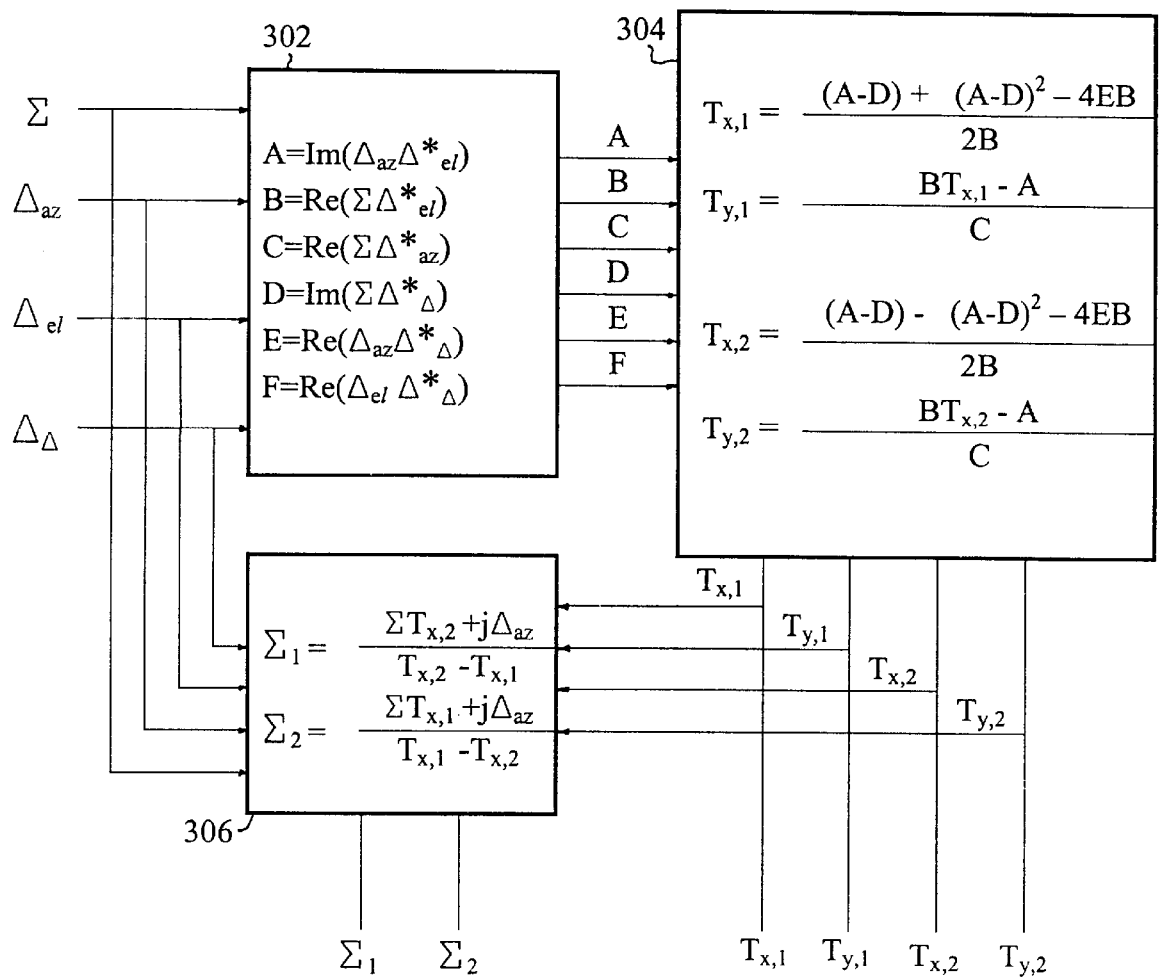
FIG. 3 is a data flow diagram of a monopulse processor embodying the present invention.

FIG. 3 is a date flow diagram of the monopulse processor this invention concerns. As shown therein, values A, B, C, D, E and F are calculated in processor section 302 using the $\Sigma$, $\Delta_{az}$, $\Delta_{el}$ and $\Delta_\Delta$ values as inputs. Using these A, B, C, D, E and F values as inputs, values for $T_{x,1}$, $T_{y,1}$, $T_{x,z}$ and $T_{y,2}$ are calculated in processor section 304. Processor section 306 is used to calculate $\Sigma_1$ and $\Sigma_2$ using the $\Sigma$, $\Delta_{az}$, $\Delta_{el}$, and $\Delta_\Delta$ inputs and using the $T_{x,1}$, $T_{y,1}$, $T_{x,z}$ and $T_{y,z}$ values from processor section 304.

Noise in the measurement will cause errors in the angle estimates. Because there is no redundant measurements (the algorithm solves for eight real variables from eight real measurements), noise will be in general indistinguishable from actual angle deviations, except when the noise is so large that equation (2) has no solution. For this reason, the invention is preferably used with high signal to noise ratio (SNR) applications.

Figure 4:
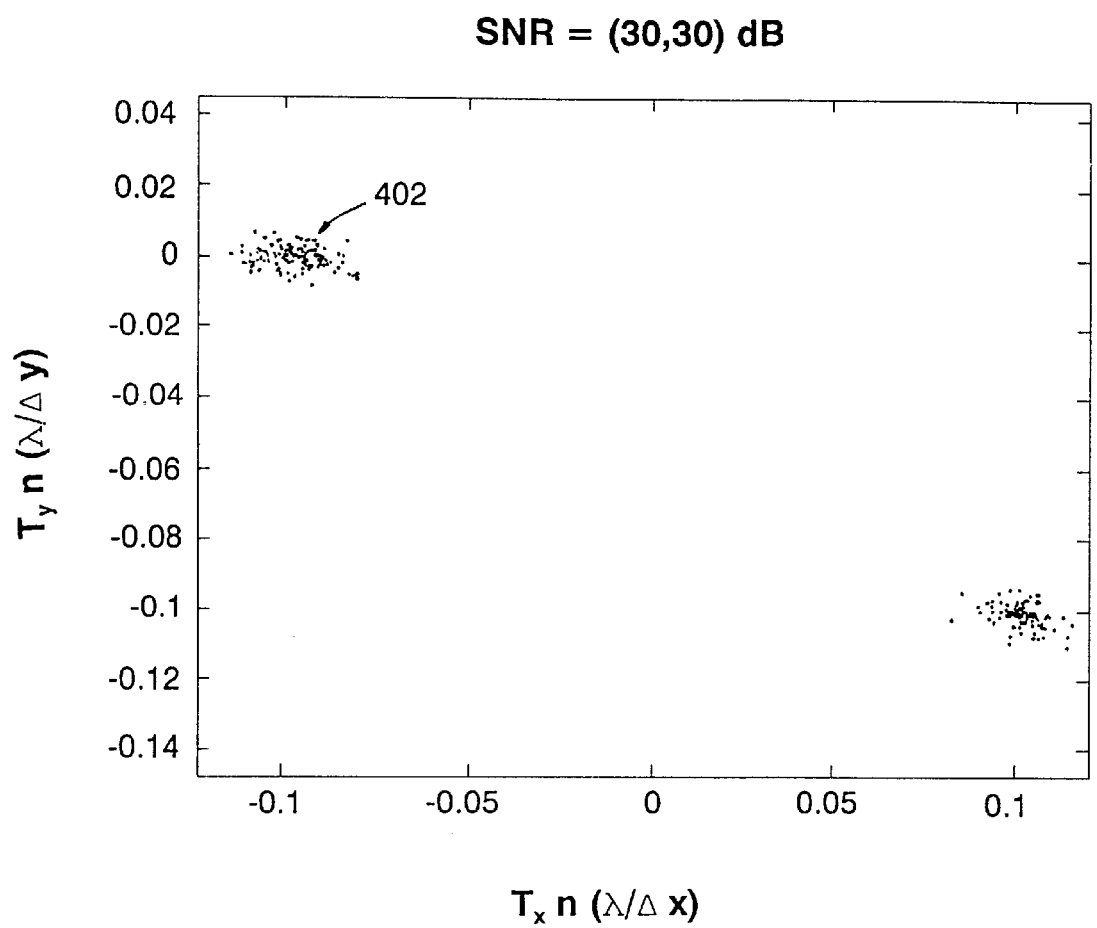
FIG. 4 is a plot demonstrating the ability of the present invention to resolve two targets in a high signal-to-noise situation.

Numerical studies have been conducted to verify that the present invention is stable in the presence of noise. Noisy measurements may be generated by adding Gaussian random noise to equation (2). Then, equation (5) is used to obtain angular estimates. Results of a total of 100 noise realizations are plotted in FIG. 4, and as illustrated therein, the present invention is clearly able to identify the true sources 402.

Numerical simulations also show that this invention performs very well when there is actually only one source. In this case, one of the estimated sources will correspond to the true source, while the other of the estimate sources, which has a very small amplitude and a very large angular estimate variance, will correspond to the non-existent source.

When two sources have the same azimuth (elevation) angles, the algorithm cannot determine their elevation (azimuth) angles, as well as their relative amplitudes. However, it must be pointed out that this limitation is due to fundamental limitations in the 4-channel configuration and not particularly to the algorithm used in this invention. Even a multiple pulse algorithm would not be able to resolve two sources in such cases. This is because, when $T_{x,1}=T_{y,2}$ or $T_{y,1}=T_{y,2}$, only three equations in (2) are independent, so the solution is fundamentally under determined.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for identifying the locations of plural targets lying within the main beam of a monopulse antenna including at least four ports for generating sum, elevation difference, azimuth difference, and double difference signals, the method comprising the steps of:

processing the sum, elevation difference, azimuth difference, and double difference signals in accordance with a series of linear equations to obtain a set of intermediate values; and processing the set of intermediate values in accordance with a set of algebraic equations to obtain signals representing an angular direction of each of the plural targets.

2. A method according to claim 1, further including the step of processing the sum, elevation difference, azimuth difference and double difference signals and the signals representing the angular directions of the targets according to a further set of algebraic equations to obtain signals representing the amplitude of the beam reflected from each of the targets.

3. A method according to claim 1, wherein the signals representing the angular direction of the targets include signals representing, for each of the targets, an angular direction of the target in an x-plane, and an angular direction of the target in a y-plane.

4. A method according to claim 1, wherein said set of linear equations include:

$$A=Im(\Delta_{az}\Delta^*_{el})$$

$$B=Re(\Sigma\Delta^*_{el})$$

$$C=Re(\Sigma\Delta^*_{az})$$

$$D=Im(\Sigma\Delta^*_\Delta)$$

$$E=Re(\Delta_{az}\Delta^*_\Delta)$$

$$F=Re(\Delta_{el}\Delta^*_\Delta)$$

where: A, B, C, D, E and F comprise the set of intermediate values;

$\Delta_{az}$ is the azimuth difference signal;

$\Delta_{el}$ is the elevation difference signal;

$\Sigma$ is the sum signal; and $\Delta_\Delta$ is the double difference signal.

5. A method according to claim 1, wherein said set of algebraic equations includes:

$$T_{x,1} = \frac{(A-D) + \sqrt{(A-D)^2 - 4EB}}{2B}$$

$$T_{y,1} = \frac{BT_{x,1} - A}{C}$$

$$T_{x,2} = \frac{(A-D) - \sqrt{(A-D)^2 - 4EB}}{2B}$$

$$T_{y,2} = \frac{BT_{x,2} - A}{C}$$

where: $T_{x,1}, T_{y,1}, T_{x,2}, T_{y,2}$ are the signals representing the angular directions of the targets; and A, B, C, D, E and F comprise the set of intermediate values.

6. A method according to claim 2, wherein said further set of algebraic equations includes:

$$\Sigma_1 = \frac{\sum T_{x,2} + j\Delta_{az}}{T_{x,2} - T_{x,1}}$$

$$\Sigma_2 = \frac{\sum T_{x,1} + j\Delta_{az}}{T_{x,1} - T_{x,2}}$$

where: $\Sigma_1$ and $\Sigma_z$ represent the amplitudes of the beam reflected respectively, from a first and from a second of the targets; and $T_{x,1}, T_{y,1}, T_{x,2}$ and $T_{y,2}$ are the signals representing the angular directions of the targets.

7. A processing system for identifying the locations of plural targets lying within the main beam of a monopulse antenna including four ports for generating sum, elevation difference, azimuth difference, and double difference signals, the processing system comprising:

a first processing section for processing the sum, elevation difference, azimuth difference, and double difference signals in accordance with a series of linear equations to obtain a set of intermediate values; and a second processing section for processing the set of intermediate values in accordance with a set of algebraic equations to obtain signals representing an angular direction of each of the plural targets.

8. A processing system according to claim 7, further including a third processing section for processing the sum, elevation difference, azimuth difference and double difference signals and the signals representing the angular directions of the targets according to a further set of algebraic equations to obtain signals representing the amplitude of the beam reflected from each of the targets.

9. A processing system according to claim 7, wherein the signals representing the angular direction of the targets include signals representing, for each of the targets, an angular direction of the target in an x-plane, and an angular direction of the target in a y-plane.

10. A processing system according to claim 7, wherein said set of linear equations include:

$A = Im(\Delta_{az}\Delta^*_{el})$ $B = Re(\Sigma\Delta^*_{el})$ $C = Re(\Sigma\Delta^*_{az})$ $D = Im(\Sigma\Delta^*_\Delta)$ $E = Re(\Delta_{az}\Delta^*_\Delta)$ $F = Re(\Delta_{el}\Delta^*_\Delta)$ where: A, B, C, D, E and F comprise the set of intermediate values;

$\Delta_{az}$ is the azimuth difference signal;

$\Delta_{el}$ is the elevation difference signal;

$\Sigma$ is the sum signal; and $\Delta_\Delta$ is the double difference signal.

11. A processing system according to claim 7, wherein said set of algebraic equations includes:

$$T_{x,1} = \frac{(A-D) + \sqrt{(A-D)^2 - 4EB}}{2B}$$

$$T_{y,1} = \frac{BT_{x,1} - A}{C}$$

$$T_{x,2} = \frac{(A-D) - \sqrt{(A-D)^2 - 4EB}}{2B}$$

$$T_{y,2} = \frac{BT_{x,2} - A}{C}$$

where: $T_{x,1}, T_{y,1}, T_{x,2}, T_{y,2}$ are the signals representing the angular directions of the targets; and A, B, C, D, E and F comprise the set of intermediate values.

12. A processing system according to claim 8, wherein said further set of algebraic equations includes:

$$\Sigma_1 = \frac{\sum T_{x,2} + j\Delta_{az}}{T_{x,2} - T_{x,1}}$$

$$\Sigma_2 = \frac{\sum T_{x,1} + j\Delta_{az}}{T_{x,1} - T_{x,2}}$$

where: $\Sigma_1$ and $\Sigma_z$ represent the amplitudes of the beam reflected respectively, from a first and from a second of the targets; and $T_{x,1}, T_{y,1}, T_{x,2}$ and $T_{y,2}$ are the signals representing the angular directions of the targets.

* * * * *